July 9, 1935. N. P. HARSHBERGER Re. 19,637
SHINGLE
Original Filed Feb. 1, 1923
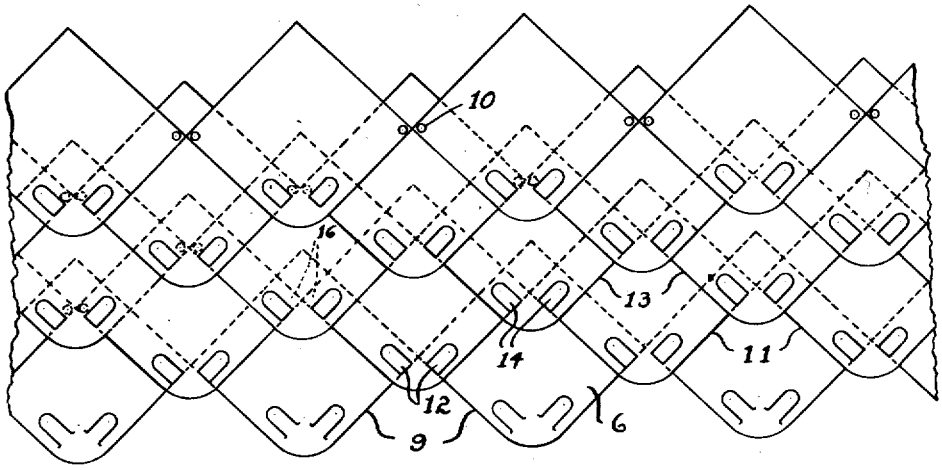
Fig.
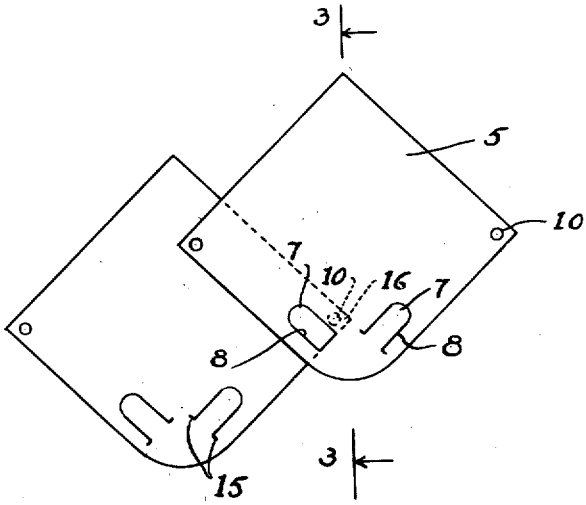
Fig. 2
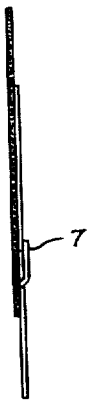
Fig. 3
INVENTOR.
Norman P. Harshberger
By E. J. Andrews
Atty.

Reissued July 9, 1935 Re. 19,637

UNITED STATES PATENT OFFICE 19,637

SHINGLE

Norman P. Harshberger, Scarsdale, N. Y., assignor to Bakelite Building Products Co. Inc., Wilmington, Del., a corporation of Delaware Original No. 1,613,100, dated January 4, 1927, Serial No. 616,252, February 1, 1923. Application for reissue January 7, 1935, Serial No. 739

12 Claims. (Cl. 108—7)

This invention relates to shingles for covering roofs, and has for its object the production of suitable shingles for the purpose so formed that the exposed part thereof may be locked down by the adjacent shingles so as to prevent the exposed part from being turned up by the wind or by warping or in any other manner. Another object of the invention is to provide shingles of such shape that the appearance of the roof, after having been covered by the shingles, will be pleasing to the eye. A further object is to provide shingles of this nature of such shape that they can be easily laid and will form a very effective waterproof cover for the roof. Other objects of the invention will be apparent from consideration of the accompanying drawing and the following description thereof.

Of the drawing, Fig. 1 is a plan view of a plurality of shingles properly assembled on the roof; Fig. 2 is a plan view of a single shingle overlapping normally another shingle; and Fig. 3 is a sectional view along the line 3—3 of Fig. 2.

So far as my invention is concerned the substances of which my shingles are composed is immaterial, but I prefer for the purpose substances which may be formed into sheets or long strips, and then may be conveniently cut by means of dies or otherwise into individual units, which are then to be applied to the roof in general in a manner somewhat similar to the ordinary manner of applying shingles. When shingles are made in this manner, when applied to the roof, as they are ordinarily more or less pliable, the exposed portions of the shingles are sometimes bent upwardly by the wind or are otherwise bent out of shape, the consequence is that the appearance of the roof is objectionable and the protection offered by the roof is more or less diminished. In order to prevent this deformation I provide means for locking down the exposed parts of the shingles to the adjacent shingles.

In general the shingles which I provide are square or at least are of the shape of a parallelogram and comprise a main or a body portion 5, which is normally covered by the adjacent shingles, the exposed portion 6 and the locking portions 7, the locking portions being fixed in any suitable manner to the lower part of the portion of the shingle which will be exposed when laid. These locking members may be fixed to the shingle in any suitable manner, but I prefer for the purpose cutting slits 8 whereby the tongue portions may be bent downwardly. These tongues when the shingles are laid may be slipped under the edges of the adjacent shingles as indicated. When the shingles are laid the lower rows of shingles 9 are laid and fastened in any suitable manner, preferably by means of nails 10. The next row of shingles 11 are then laid staggered with reference to the lower row with the tongues 7 of the shingles 11 projecting under the edges 12 of the two adjacent underlying shingles 9. The layer 13 is then laid staggered with the shingles 11, but in line with the shingles 9, and with the tongues of the shingles 13 locked under the edges 14 of the adjacent underlying shingles 11; and so on until the roof is covered; each shingle as thus laid being fastened by nails 10 near the corners thereof.

Referring to Fig. 1 it will be seen that the exposed portion of each of the shingles forms a square or rectangular shaped figure which is pleasing to the eye; and by rounding the lower corners of the shingles, the exposed edges, together with the edges of the slits 8 gives a pleasing appearance to the roof. However, it should be understood that my invention is not to be considered as confined to square or rectangular shaped shingles, as the shingles may be diamond shaped or other shapes in general without departing from the spirit of my invention as disclosed by the appended claims.

In order to facilitate the laying of the shingles and to prevent any tearing tendency of the edges of the slitted portion of the shingle I provide slits 15 which not only will allow the tongues to bend inwardly more readily but also allows the edges of the adjacent shingles to pass more freely over the tongues without danger of tearing the shingles; that is the slits 15 allow the tongues to be more freely offset or spaced from the plane of the shingle to which the tongues are fixed.

This invention is an improvement on the invention disclosed in my copending application, Serial No. 604,733, filed Dec. 4, 1922, and the difference between these two inventions is specifically set forth in the appended claims. It will be noticed that the two tongues in each shingle, as shown in the drawing of this application, are entirely independent of each other, and are spaced apart sufficiently so that the corners 16 of the shingles of one layer extend upwardly clear beyond the ends of the slits 8 of the overlying layer. This allows the corners 16 to be nailed at the points indicated and thus the nail heads are completely protected from the weather as they are entirely above the slits. Furthermore with the independent slits shaped as indicated the shingles are more readily placed in position, and are more effectively locked down.

I claim as my invention:

1. An article of manufacture comprising a shingle having fixed to the inner portion thereof a material distance from the edges but adjacent one corner of the shingle two independent tongues which are adapted to lie under the respective edges of the two adjacent underlying shingles, said tongues being formed by cutting slits on the inner portion of said shingle so that the tongue may be bent downwardly out of the plane of the shingle, said shingle having another slit extending from each end of the tongue slits and at an angle thereto.

2. A plurality of shingles adapted to be laid on the roof in rows, one row partly overlapping another row and the shingles in each row being staggered with reference to the adjacent row, the overlapping shingles having upwardly projecting tongues on their lower side, the ends of each of said tongues being adapted to pass under the respective adjacent edges of the underlying shingles, said tongues being independent of each other and spaced a material distance apart.

3. A roof covering comprising a plurality of shingles laid in rows, one row partly overlapping another row, and the shingles in each row being staggered with reference to the adjacent row, each shingle having two upwardly extending integral tongues, said tongues being spaced inwardly from the edges of the shingle and the ends of each of said tongues being positioned beneath the adjacent edge of an underlying shingle.

4. A roof comprising a plurality of shingles laid in rows, one row overlapping another row and each shingle extending across the adjacent edges of two underlying shingles, and each of said shingles having two upwardly extending integral tongues projecting from the lower side thereof and passing under the respective edges of the underlying shingles, and an opening in each shingle registering with each of said tongues and being of similar size and shape as the tongue.

5. A roof comprising a plurality of shingles laid in rows, one row overlapping another row and each shingle extending across the adjacent edges of two underlying shingles, and each of said shingles having two upwardly extending integral tongues projecting from the lower side thereof and passing under the respective edges of the underlying shingles, each of said shingles having a slit therein which separates a portion of each of said tongues from said shingle.

6. An article of manufacture comprising a shingle, two spaced tongues fixed to the inner portion of the said shingle at a material distance from the edges of said shingle and extending upwardly and outwardly in opposite directions, each of said tongues being adapted to lie under an adjacent underlying shingle.

7. A plurality of shingles covering a roof, each of said shingles having two tongues integral with and fixed thereto a material distance from its lower edges, said tongues being spaced apart and extending outwardly away from each other, and each projecting beneath an adjacent underlying shingle.

8. An article of manufacture comprising a shingle, the periphery of which forms substantially a parallelogram, said shingle having two internal tongues fixed adjacent one corner thereof, and spaced apart, one edge of each of said tongues being substantially parallel with the adjacent edge of the shingle.

9. A shingle, the edges of which form substantially a parallelogram and having locking means adjacent one corner, said shingle having two independent openings partly surrounding said respective means, each of said openings having one edge parallel with the adjacent edge of the shingle.

10. A roofing shingle having a body of sheet material provided with a pair of tongues arranged wholly within the border edge of the body and formed by slits in the body at a distance from the edge thereof and on opposite sides of a center line and adapted to interlock with the edges of adjacent shingles.

11. A roofing comprising a plurality of rows of shingles arranged obliquely and each shingle of an upper row being arranged midway between two shingles of a lower row and overlapping the same, and each shingle in an upper row being provided on the lower corner of its body within the border edge of the same and on opposite sides of its vertical center line with two upwardly projecting tongues which are formed by slitting the body at a distance from its edge and are adapted to engage underneath the edges of the bodies of the adjacent shingles for the purpose of interlocking the same.

12. A roofing comprising a plurality of shingles adapted to be arranged in rows and each shingle of one row overlapping two shingles in another row and having two tongues formed wholly within the border edge thereof and adapted to engage underneath the edges of the other shingles.

NORMAN P. HARSHBERGER.